July 13, 1937.

A. E. LOOMIS 2,086,774

TRACTOR

Filed May 11, 1936

Inventor
Allen E. Loomis

By Caswell & Lagaard
Attorneys

July 13, 1937.  A. E. LOOMIS  2,086,774
TRACTOR
Filed May 11, 1936   3 Sheets-Sheet 2

Inventor
Allen E. Loomis
By Caswell & Lagaard
Attorneys

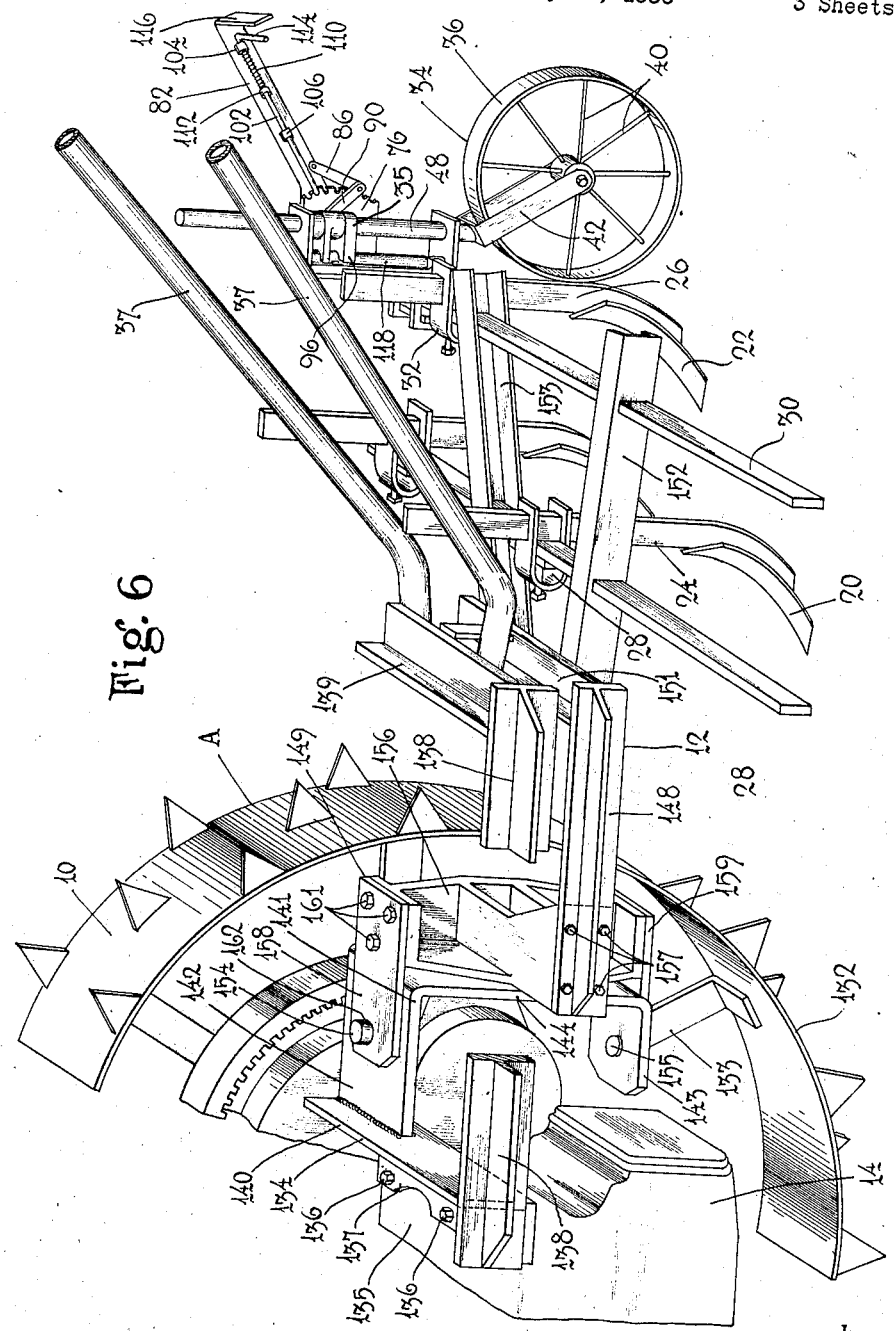

Patented July 13, 1937

2,086,774

UNITED STATES PATENT OFFICE 2,086,774

TRACTOR

Allen E. Loomis, Minneapolis, Minn., assignor to American Farm Machinery Company, St. Paul, Minn., a corporation of Minnesota Application May 11, 1936, Serial No. 79,007

12 Claims. (Cl. 97—48)

My invention relates to wheel supported ground working implements and has for an object to provide an implement which will be extremely convenient and practical in use.

My invention relates particularly to a ground working implement in the nature of a motor propelled garden cultivator provided with one or more front driving wheels and a trailer wheel and having ground working tools adapted to be brought into engagement with the ground and to be elevated therefrom, and has for another object to provide a device by means of which the trailer wheel may be held parallel with or in alignment with the driving wheel when the tools are in engagement with the ground and which may swivel or caster to permit of steering the cultivator when the tools are raised above the ground.

Another object of the invention resides in providing a tool frame carried at its forward end by the engine frame and adjustable vertically at its rearward end relative to a support carried by said trailer wheel and in further providing means for guiding said support for swinging movement to permit the trailer wheel to caster when the frame is elevated and for holding the support in fixed position when the frame is lowered.

A still further object of the invention resides in constructing the tool frame and the support with juxtaposed parts and in providing a key on one of said parts cooperating with a guideway on the other of said parts to hold the support from swinging movement, said key and guideway becoming disengaged when the frame is elevated to permit the trailer wheel to caster.

Another object of the invention resides in constructing the key and keyway of a combined length less than the vertical adjustment of the tool frame relative to the support so as to procure disengagement of said key and keyway when the frame is in one position relative to the support.

A feature of the invention resides in constructing the tool frame with a yoke having two horizontal reaches provided with bearings therein and in constructing the support with a post slidable and rotatable within said bearings.

An object of the invention resides in attaching said key to said yoke and the member on which the keyway is formed to said post.

A feature of the invention resides in constructing the combined length of the key and keyway shorter than the distance between the reaches of said yoke.

Another object of the invention resides in providing a head swivelly mounted on said post and a shoulder on said post cooperating therewith by means of which the weight of the tool frame may be transferred to the support.

A still further object of the invention resides in providing a lever pivoted at one end to the tool frame and having a pivotal connection with said head whereby the tool frame may be raised and lowered with respect to the head.

Another object of the invention resides in pivoting said tool frame to the engine frame at a locality within the confines of the tread of said driving wheel, when a single front driving wheel is used.

A still further object of the invention resides in the specific construction by means of which the tool frame is connected to the engine frame.

Other objects of the invention reside in the novel combination and arrangement of parts and in the details of construction hereinafter illustrated and/or described.

In the drawings:

Fig. 6 is a perspective view of a portion of the tractor illustrating the method of connecting the tool frame to the engine frame.

In the use of garden tractors steered by an operator working behind the tractor, considerable difficulty has been encountered in causing the tractor to travel in a straight line when used for cultivating purposes. This is especially true where the tractor is provided with a trailer wheel for supporting the rearward portion of the frame and which is adapted to caster for the purpose of steering the tractor when the ground engaging tools are elevated above the ground. The present invention overcomes this difficulty by providing a construction whereby the trailer wheel may be used in the customary manner so as to caster when the tools are elevated above the ground and which may be held rigidly in parallel relation or in alignment with the driving wheel when the tools are in engagement with the ground to cause the tractor to travel in the desired manner.

Figure 1:
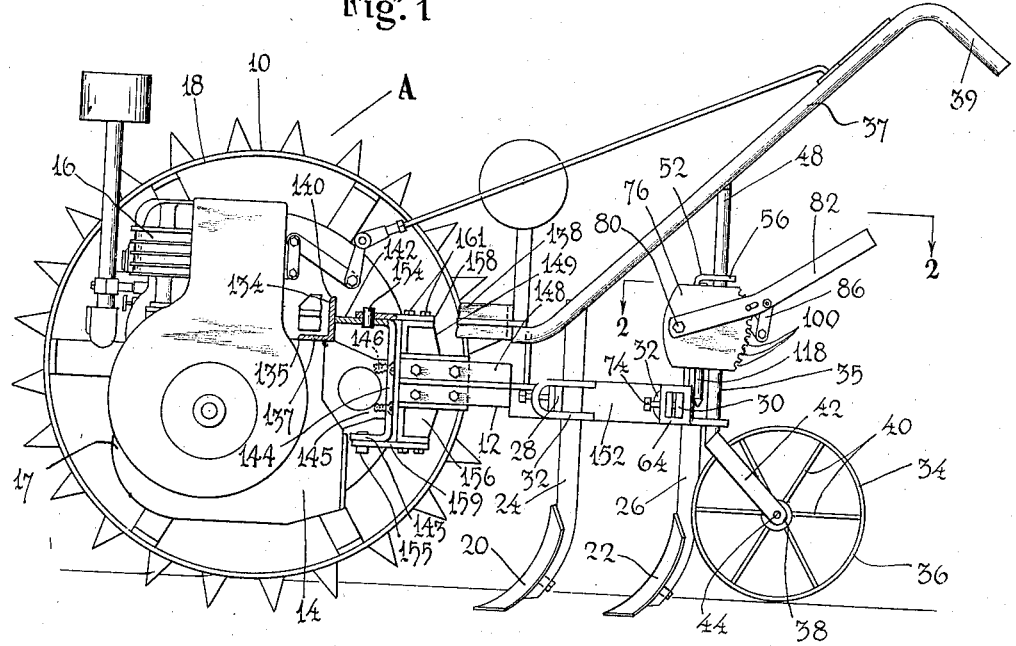
Fig. 1 is an elevational view of a garden tractor illustrating an embodiment of my invention with portions thereof cut away.

For the purpose of illustrating the application of my invention, I have shown in Fig. 1 a cultivator indicated in its entirety by the reference character A. The cultivator A consists of a single drive wheel 10 which is journaled on a suitable axle, not shown. The tractor further includes an engine frame 14 in the nature of a case or housing which is supported on the wheel axle and which carries an engine 16 and a transmission 17. In the type of tractor illustrated a single drive wheel is used which is driven by the engine 16 and the engine 16 and transmission 17 are disposed mainly within the confines of said wheel. To make this possible said wheel is constructed with a rim 132 and with spokes 133 extending radially therefrom and disposed at one edge of the rim. The construction of the engine and transmission and the construction for supporting the frame 14 on the wheel axle forming no particular feature of the invention has not been shown or described in detail in this application.

The engine frame 14 includes a bracket 134 consisting of a piece of angle iron, which is secured to a wall 135 of said frame by means of bolts 136. These bolts extend through one of the flanges 137 of said bracket and are screwed into the wall 135. The end of the bracket 134 has welded to it a longitudinally extending frame member 138. The rearward end of this frame member has welded to it a transverse frame member 139 which is disposed immediately to the rear of wheel 10. Secured to the bracket 134 is an attaching lug 141, U-shaped in form having upper and lower legs 142 and 143 and a connecting portion 144. The leg 142 is welded to the flange 140 of bracket 134 and issues rearwardly therefrom, being disposed substantially horizontally. The connecting portion 144 of lug 141 is attached to a part 145 of the frame 14 by means of bolts 146.

The cultivator as previously mentioned is steered and controlled by the operator who walks behind the same. For the purpose, one or more handles 37 are employed which are welded to the cross frame member 139 of frame 14 and extend rearwardly thereof and upwardly therefrom. These handles are provided at their upper ends with hand grips 39 by means of which said handles may be manipulated. In steering the entire frame 14, wheel 10 and the engine 16 and transmission 17 are turned upon movement of said handles.

Connected to the engine frame 14 is a tool frame 12 which is pivoted to swing laterally of the tractor or with reference to which the frame 14 may be moved laterally by manipulation of the handles 37. This frame comprises a longitudinal frame member 148 which is provided at one end with a clevis 149 and at its other end with a cross frame member 151 welded thereto. The cross frame member 151 has welded to it two spaced longitudinal frame members 152 and 153 which in turn have secured to them two transverse tool beams 28 and 30.

As stated, the frame 12 is pivoted to the frame 14 by means of the clevis 149. For this purpose two trunnions 154 and 155 are provided which are welded to the legs 142 and 143 of the lug 141 and which are disposed in alignment and extend outwardly from said legs in opposite directions. The clevis 149 consists of a casting 156 which is bolted to the frame member 148 by means of bolts 157. This clevis further includes two plates 158 and 159 which are bolted to the casting 156 by means of bolts 161. The two trunnions 154 and 155 pass through holes 162 in said plates 158 and 159, whereby the clevis is pivoted to the frame 14. It will be noted that frame 12 is pivoted to the frame 14 in the plane of the wheel 10 passing through the center thereof and may swing laterally from side to side to clear the rim 132 of said wheel.

The cultivator further includes a plurality of ground working tools 20 and 22 which are attached to posts 24 and 26. These posts are in turn secured to the beams 28 and 30 by means of clamps 32. The two tools 20 and 22 may be raised and lowered vertically and may also be adjusted laterally with respect to the beams 28 and 30 by means of the clamps 32.

For supporting the rearward portions of the frame 12, two trailer wheels 34 are employed. A support 35 is carried by each of these wheels. These wheels and the structure for supporting the same being identical in construction only the left hand wheel and its associated parts will be described in detail.

Figure 3:
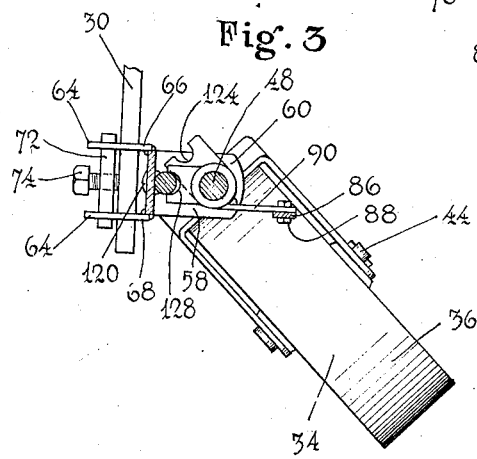
Fig. 3 is a view similar to Fig. 2 showing the parts in altered position.
Figure 2:
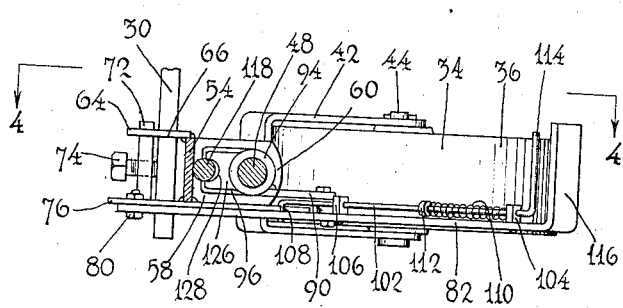
Fig. 2 is a fragmentary plan sectional view taken on line 2—2 of Fig. 1.
Figure 4:
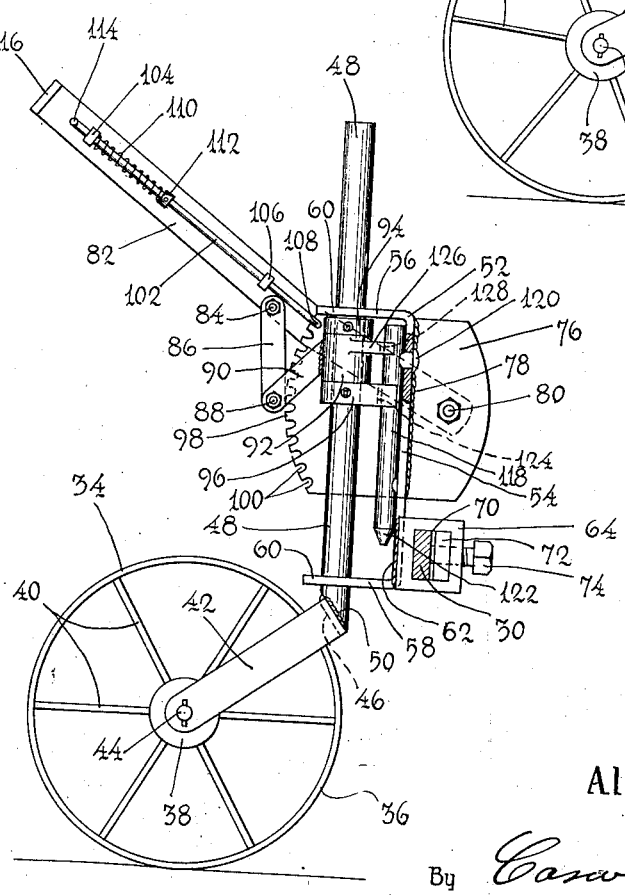
Fig. 4 is an elevational sectional view taken on line 4—4 of Fig. 2.

The wheel 34 is provided with a rim 36, a hub 38 and spokes 40 connecting said rim and hub. A fork 42 straddles the wheel 34 and an axle 44 passes through said fork and the hub 38 journaling said wheel for rotation. Fork 42 extends angularly forwardly and has attached to the connecting portion 46 thereof a cylindrical post 48 which is welded thereto as indicated at 50. This structure forms part of the support 35 which in addition includes a yoke 52 best shown in Fig. 4. Yoke 52 has a vertical reach 54 and two horizontal reaches 56 and 58 extending outwardly from the reach 54 and parallel to one another. These latter reaches are constructed with holes, not shown, which form bearings 60 which slidably and rotatably support the post 48, and permit the wheel 34 to swing in a manner to facilitate steering of the cultivator. The yoke 52 is welded as indicated at 62 to clamp 64 which consists of two spaced parallel plates 66 and 68 constructed with rectangular openings 70 therein. A short bar 72, Fig. 3, passes through the openings 70 in plates 66 and 68 and also the beam 30 passes through these openings. This bar is threaded to receive a set screw 74 which engages the beam 30 and holds the yoke 52 rigidly secured to said beam.

For the purpose of raising and lowering the rearward portion of frame 12 with reference to the wheels 34 the following construction is used. A plate 76 is secured to the yoke 52 by means of welding indicated at 78. This plate has pivoted to it by means of a bolt 80 a lever 82 which extends rearwardly of said plate. Lever 82 has pivoted to it by means of a bolt 84 a depending link 86 which in turn is pivoted by means of a bolt 88 to an arm 90 formed on a swivel head 92. Head 92 is rotatably mounted on the post 48 and on its upper surface is engaged by a collar 94 secured to said post and on its under surface is engaged by a member 96 which is also secured to said post. It will thus be readily comprehended that as the lever 82 is raised and lowered the rearward portion of frame 12 is correspondingly raised and lowered.

In order to hold the frame 12 in adjusted position the plate 76 is constructed with a segment 98 which is provided with a number of notches 100. A latch rod 102 is slidably mounted in two guides 104 and 106 attached to lever 82 and is provided at its extreme end with a dog 108 for engagement with the notches 100. A spring 110 encircling the rod 102 is seated at one end against the guide 102 and at its other end against a collar 112 secured to said rod. This spring urges the dog 108 into engagement with the notches 100 of segment 98. A finger piece 114 at the end of said rod facilitates manipulation of the latch rod 102. The end of the lever 82 is preferably constructed with a hand piece 116 by means of which the said lever may be conveniently manipulated.

Figure 5:
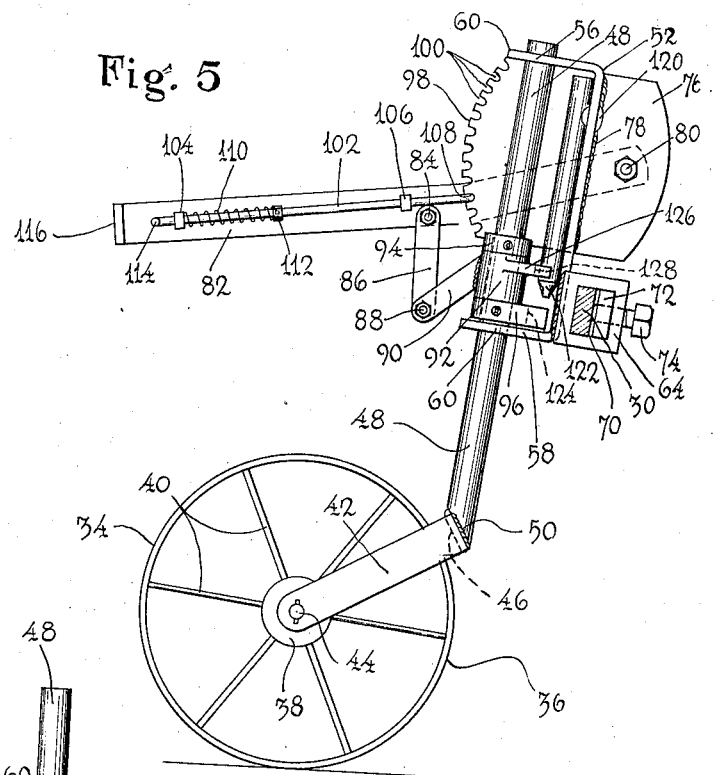
Fig. 5 is a view similar to Fig. 4 showing the parts in altered position.

As previously brought out, one purpose of the invention is to maintain the wheels 34 parallel with or in alignment with the wheel 10 when the tools 20 and 22 are in engagement with the ground and to permit said wheels to caster when the tools are raised above the ground. This is accomplished in the following manner. Secured to the vertical reach 54 of yoke 52 is an elongated key 118. This key is attached to said reach by welding which is accomplished by drilling two holes through the reach and by welds 120 extending through said holes and fused to said key. The key 118 may be constructed from a cylindrical rod and the lower end of the same is formed with a conical or pointed end 122. This point is situated above the lowermost horizontal reach 58 of yoke 52 a distance greater than the height of the member 96 for a purpose to be presently described. Member 96 is constructed with a notch 124 which engages the key 118 and serves as a keyway slidable along said key. By means of this notch the member 96 when in engagement with the key is held from rotation and likewise the wheel 34 mounted in fork 42 is maintained parallel with the wheel 10. When the member 96 reaches its lowermost position, as shown in Fig. 5, the said member is free from the key and the wheel 34 may caster. During such movement, the cultivator may be steered and wheel 34 trails or casters in the customary manner.

To relieve twisting strain on the link 86, arm 90 and head 92 when the post 48 is rotating with respect to the bearings 60, a guide member 126 is employed which is similar to guide member 96 and which is constructed with a notch 128 also engaging the key 118. This member is always in engagement with key 118 and restrains rotation of the head 92. It will thus be seen that rotation of the said head is prevented without strain upon the link 86 or associated parts.

The operation of my invention is as follows: When it is desired to move the cultivator about without working the ground, levers 84 are both depressed by means of the hand pieces 116 and during movement into their lowermost positions the dogs 108 are disengaged from the notches 100 of segments 92 through manipulation of the finger pieces 114 of latch rods 102. When the parts reach the position shown in Fig. 5 the dogs 108 are brought into engagement with the proper notches 100 and the parts are so held. In such position the tools 20 and 22 clear the ground and the cultivator may be propelled about without working the ground. It will be seen from Fig. 5 that when the parts are in such position the guide member 96 is clear of the key 118 so that wheels 34 may caster or trail, thereby permitting the cultivator to be steered by merely shifting the handles 37 in the customary manner. When it is desired to use the cultivator for cultivating purposes, the levers 82 are raised which lowers the frame 12 and brings the tools 20 and 22 into engagement with the ground. When the proper elevation of the tools has been procured the dogs 108 are brought into engagement with the proper notches 100 in segment 98 and the cultivator is ready for use. The cultivator is then operated in the customary manner and functions to till the soil as desired. The key 118 is of sufficient length so that as soon as the tools 20 and 22 are brought into engagement with the ground, member 96 is brought into engagement with the key 118. Before this can be accomplished, the wheels 34 must be arranged substantially parallel to the frame 12. As the frame 12 is lowered the pointed ends 122 of said keys enter the notches or keyways 124 in members 96 and the wheels are brought into proper parallel relation. The pointed ends 122 facilitate the operation so that accurate placing of the wheels is not necessary. After the tools have been brought into engagement with the ground, the cultivator travels in the customary manner and is steered by manipulation of the handles 37 in the usual manner.

Although I have referred to my invention for use with a cultivator, it can readily be comprehended that any type of ground working tools may be applied to the frame 12.

The advantages of my invention are manifest. An extremely simple and practical construction is provided by means of which the steering of the cultivator is greatly facilitated. When the tools are elevated above the ground the cultivator can be manipulated and steered to swing the cultivator about a short radius. With my invention it becomes impossible to improperly arrange the parts, the said functions being automatically procured when the frame of the cultivator is raised and lowered.

Changes in the specific form of my invention, as herein disclosed, may be made within the scope of what is claimed without departing from the spirit of my invention.

Having described my invention, what I claim as new and desire to protect by Letters Patent is:

1. In a vehicle having a frame, a front wheel for supporting the forward portion thereof, a rear wheel, a support for the rearward portion of said frame carried by said rear wheel, said support including a vertically extending post, means on said frame for guiding said frame for vertical movement along said post and rotational movement relative thereto, said support and frame having juxtaposed parts, a key on one of said parts, and means forming a keyway on the other of said parts cooperating with said key to restrain rotational movement of said support, said key and keyway becoming disengaged at one position of said frame relative to said support to accommodate rotational movement of the post relative to the frame, a head swivelly mounted on said post, a shoulder on said post and engaging said head, a lever, a pivotal connection between said frame and lever, and a second pivotal connection between said head and lever.

2. In a vehicle having a frame, a front wheel for supporting the forward portion thereof, a rear wheel, a support for the rearward portion of said frame carried by said rear wheel, said support including a vertically extending post, means on said frame for guiding said frame for vertical movement along said support and rotational movement relative thereto, said support and frame having juxtaposed parts, a key on one of said parts, and means forming a keyway on the other of said parts cooperating with said key to restrain rotational movement of said support, said key and keyway becoming disengaged at one position of said frame relative to said support to accommodate rotational movement of the post relative to the frame, a head swivelly mounted on said post, a shoulder on said post and engaging said head, a lever, a pivotal connection between said frame and lever, and a second pivotal connection between said head and lever, one of said connections including a link.

3. In a vehicle having a frame, a front wheel for supporting the forward portion thereof, a rear wheel, a support for the rearward portion of said frame carried by said rear wheel, said support including a vertically extending post, means on said frame for guiding said frame for vertical movement along said support and said support for rotational movement, said support and frame having juxtaposed parts, a key on one of said parts, and means forming a keyway on the other of said parts cooperating with said key to restrain rotational movement of said support, said key and keyway becoming disengaged at one position of said frame relative to said support to accommodate rotational movement of the post relative to the frame, a head swivelly mounted on said post, a shoulder on said post and engaging said head, a lever, a pivotal connection between said frame and lever, and a second pivotal connection between said head and lever, the connection between said lever and head including a link pivoted at one end to said lever and at its other end to said head.

4. In a vehicle having a frame, a front wheel for supporting the forward portion thereof, a rear wheel, a support for the rearward portion of said frame carried by said rear wheel, said support including a post, a yoke carried by said frame and having horizontal reaches formed with bearings in which said post is rotatably and slidably mounted, two juxtaposed members, one of said members being attached to the yoke and the other to said post, one of said members constituting a key and the other having a groove therein cooperating with said key to restrain rotational movement of the post relative to said yoke when the post is in one position with respect to said yoke, said key and keyway becoming disengaged when the post is in another position, said bearings guiding said post for rotational movement when the post is in such position, a plate attached to said yoke, a lever pivoted to said plate, a head swivelly mounted on said post, a shoulder on said post engaging said head, and a link connected at one end to said head and at its other end to said lever and serving through swinging of said lever to raise and lower the frame relative to said post.

5. In a cultivator, a front driving wheel, a trailing wheel, a frame between said wheels, tools carried by said frame and adapted to be moved into engagement with the ground or to be elevated above the ground, means for holding said trailing wheel in parallel relation with respect to said frame when the tools are in engagement with the ground, and means for guiding said trailer wheel for swinging movement in a manner to permit of steering the cultivator when the tools are elevated above the ground.

6. In a cultivator, a single front driving wheel, a trailing wheel, an engine frame disposed within the rim of said driving wheel, a tool frame supported by said trailing wheel and a pivot between said tool frame and said engine frame, said pivot being disposed within the confines of the rim of said driving wheel.

7. In a cultivator, a single front driving wheel, a trailing wheel, an engine frame disposed within the rim of said driving wheel, a tool frame supported by said trailing wheel and a pivot between said tool frame and said engine frame, said pivot being disposed within the confines of the rim of said driving wheel, and having its axis disposed in the plane of the rim of said driving wheel passing through the center of the wheel.

8. In a cultivator, a single front driving wheel, a trailing wheel, an engine frame disposed within the rim of said driving wheel and extending from the front to the rear of said driving wheel, a tool frame disposed rearwardly of said driving wheel and supported by said trailer wheel, and a substantially vertical pivot between said tool frame and said engine frame, said pivot being situated at the rearward portion of said engine frame and disposed within the confines of the rim of said driving wheel and having its axis disposed in the plane of the rim of said driving wheel passing through the center of the wheel.

9. In a vehicle having a frame, a front wheel for supporting the forward portion thereof, a rear wheel, a support for the rearward portion of said frame carried by said rear wheel, said support including a post, a yoke carried by said frame and having horizontal reaches formed with bearings in which said post is rotatably and slidably mounted, two juxtaposed members, one of said members being attached to the yoke and the other to said post, one of said members constituting a key and the other having a groove therein cooperating with said key to restrain rotational movement of the post relative to said yoke when the post is in one position with respect to said yoke, said key and keyway becoming disengaged when the post is in another position, said bearings guiding said post for rotational movement when the post is in such position, a segment attached to said yoke, a lever pivoted to said segment and adapted to be held in adjusted position thereby, and means acting between said lever and post for raising and lowering said yoke relative to said post upon swinging of said lever.

10. In a vehicle having a frame, a front wheel for supporting the forward portion thereof, a rear wheel, a support for the rearward portion of said frame carried by said rear wheel, said support including a post, a yoke carried by said frame and having horizontal reaches formed with bearings in which said post is rotatably and slidably mounted, two juxtaposed members, one of said members being attached to the yoke and the other to said post, one of said members constituting a key and the other having a groove therein cooperating with said key to restrain rotational movement of the post relative to said yoke when the post is in one position with respect to said yoke, said key and keyway becoming disengaged when the post is in another position, said bearings guiding said post for rotational movement when the post is in such position, a segment attached to said yoke, a lever pivoted to said segment and adapted to be held in adjusted position thereby, and a link acting between said lever and post for raising and lowering said yoke relative to said post upon swinging of said lever.

11. In a vehicle having a frame, a front wheel for supporting the forward portion thereof, a rear wheel, a support for the rearward portion of said frame carried by said rear wheel, said support including a post, a yoke carried by said frame and having horizontal reaches formed with bearings in which said post is rotatably and slidably mounted, two juxtaposed members, one of said members being attached to the yoke and the other to said post, one of said members constituting a key and the other having a groove therein cooperating with said key to restrain rotational movement of the post relative to said yoke when the post is in one position with respect to said yoke, said key and keyway becoming disengaged when the post is in another position, said bearings guiding said post for rotational movement when the post is in such position, a plate attached to said yoke, a lever pivoted to said plate, a head swivelly mounted on said post, a shoulder on said post engaging said head, a link connected at one end to said head and at its other end to said lever and serving through swinging of said lever to raise and lower the frame relative to said post, and means on said yoke for holding said head from rotation.

12. In a vehicle having a frame, a front wheel for supporting the forward portion thereof, a rear wheel, a support for the rearward portion of said frame carried by said rear wheel, said support including a vertically extending post, means on said frame for guiding said frame for vertical movement along said support and said support for rotational movement, a cylindrical key on said frame parallel with said post and supported from the portion thereof remote from said post and free at its lowermost end, a guide member on said post having a curved notch engaging said key, said member becoming disengaged from said key when it passes below the free end thereof, and means for raising and lowering said frame relative to said post.

ALLEN E. LOOMIS.